Feb. 6, 1945.          G. A. FASOLD          2,368,977
MIXING MACHINE
Filed Oct. 22, 1942

INVENTOR.
GEORGE A. FASOLD
BY
ATTORNEY.

Patented Feb. 6, 1945

2,368,977

UNITED STATES PATENT OFFICE 2,368,977

MIXING MACHINE

George A. Fasold, Mount Healthy, Ohio, assignor to The Philip Carey Manufacturing Company, a corporation of Ohio Application October 22, 1942, Serial No. 462,901

3 Claims. (Cl. 259—107)

This invention relates to mixing, by agitating with an impeller somewhat resembling the rotor of a centrifugal pump, two or more different kinds of materials, and particularly mixing finely divided solid material with a thermo-plastic or thermo-setting binding material while the latter is maintained in a liquid or semi-liquid condition by means of heat. The materials are thoroughly commingled into a uniform and homogeneous mixture with the finely divided solid particles distributed throughout the binding material.

The impeller is mounted near the bottom of a tank with blades so disposed that a circulatory path or orbit is provided through which the materials to be mixed are forced. They are drawn down the center of the tank and expelled radially at the bottom thereof. Blades or paddles are also provided near the top of the tank and adjacent to its side wall to agitate the materials and bring them into the circulatory path or orbit described by the impeller and avoiding any zones outside of the orbit in which agitation is not set up.

A batch or charge of materials to be mixed is fed into the tank at intervals for mixing, after which the mixed batch is ejected and another batch or charge received. The entire batch or charge of materials in the mixer is circulated many times a minute through the circulatory path or orbit and thoroughly mixed, and there are no zones outside of the orbit in which any portions of the batch may become lodged and not subjected to agitation.

The invention is particularly adapted for mixing bituminous material, such as asphalt, which is heated to about 450° F. and at such temperature is in a highly fluid condition. Finely divided asbestos material or other filling materials of fibrous or finely-divided nature, screened to pass about 14 mesh or finer sieve, is mixed with the bituminous material to provide a filled bituminous coating for prepared asphalt roofing sheets, mopping layers in built-up roofing, and for other similar uses.

The filling material and asphalt may, for example, be mixed in proportions such that the resulting composition will contain about 45 to 75% by weight of bitumen and about 25 to 55% of filler by weight. Thus, I have found that a batch composed of about 1800 lbs. of asphalt and 1800 lbs. of filling may be advantageously mixed together at one mix. The filling material may, if desired, be preheated up to the temperature of the asphalt or above.

The filling material tends to float on the liquid asphalt and is not readily drawn down into the circulatory path or orbit even though the asphalt is highly liquid and a high degree of agitation is set up within the tank. This difficulty is overcome according to this invention by providing near the top of the tank mechanical means to agitate the materials and move them towards the center of the tank above the impeller and into the circulatory path or orbit described by the impeller. Accordingly, by this means all of the materials are subjected to the force of the impeller where agitation and mixing of the materials take place.

The binding material begins to cool after being placed in the tank, and cooling is, of course, hastened if the added filling material is relatively cool. The mixing of the materials is at such temperatures that the mixture, when mixing is complete, will be workable and spreadable upon a felt sheet in the manufacture of roofing. The completed mixture is plastic or semi-plastic and may be so heavy as to be described as having about the consistency of apple butter, and although it can easily be displaced or spread, it is not freely flowable. When the composition becomes of a heavy consistency that is not freely flowable, the employment of this invention is particularly advantageous due to the fact that there the limitations as to the degree of heat which can be maintained during mixing and as to the extent to which plasticity can be reduced by heating. Since the liquid asphalt is first placed in the mixer before the filling material is added, part of the asphalt is in the circulatory path or orbit of the impeller and is freely flowable. This is not true of the portion adjacent the top of the tank and outside the circulatory path or orbit of the impeller. Thus there is a line of cleavage or separation between the orbit about the impeller and the top portion of the tank or the portion outside of this orbit. No sufficient agitation is set up outside of the orbit and the materials, particularly the finely divided solid filling material and that portion of the asphalt contacted by the finely divided material, collect and remain outside of the orbit. Even when the materials are partially mixed, the consistency of the mixture is such as to cause a line of cleavage and segregate a partially mixed portion from a uniformly mixed portion. Means are provided to move the materials into the orbit of the impeller and to agitate them, thereby insuring repeated movement of circulation of the entire batch into and through the orbit where they are thoroughly commingled.

For a better understanding of the invention, reference may be made to the accompanying drawing, in which.

Figure 1:
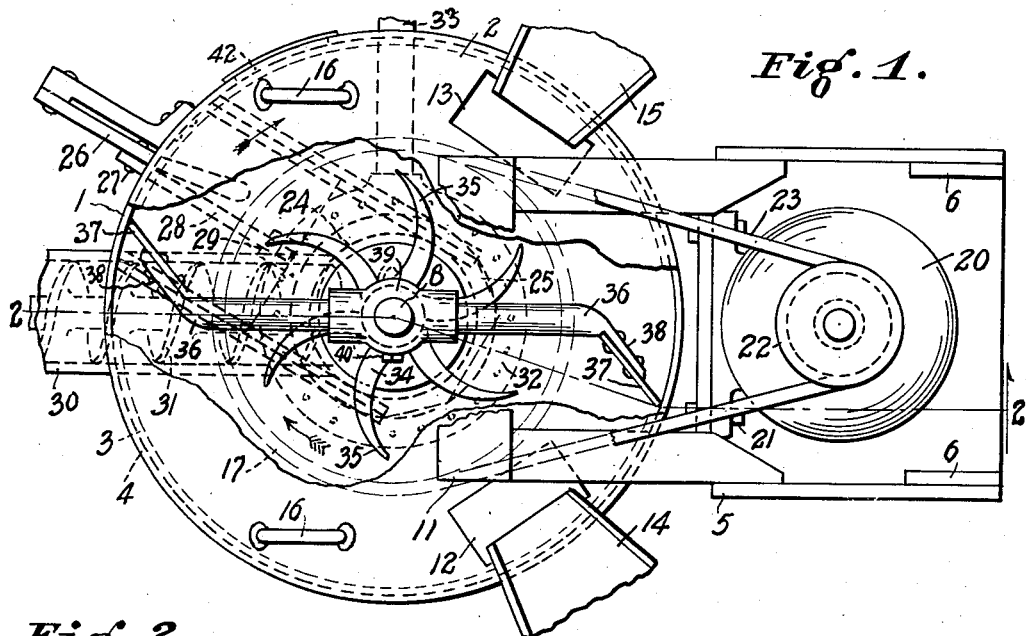
Fig. 1 is a top plan view of an apparatus embodying the invention.

Referring to the drawing, in which like numerals are used to designate like parts, numeral 1 is a cylindrical tank having an open top which is closed by a cover 2 snugly fitted thereto by means of a rabbet edge 3 engaging the rim 4 of the tank. The tank is conveniently mounted on any suitable table or support 5 on legs 6.

The cover is recessed at 7 to accommodate a vertical spindle 8 which is journaled in bearing 9. The bearing is bolted at 10 to a supporting arm 11 projecting from some part of the frame or standard on the table or support. The cover may also be provided with openings 12 and 13 through which the materials to be mixed may be conveniently fed into the tank. The bituminous material can be fed in through a spout or nozzle 14, and the finely divided material can be fed in through a spout or nozzle 15 from any sources of supply. A handle 16 is provided on the cover to facilitate lifting it.

A driven pulley 17 is fixed to upper end of the spindle 8 as by a nut 18 clamping it against a shoulder or collar 19 on the spindle. An electric motor 20, or other power device, is bolted at 21 to the frame with a drive pulley 22 fixed to the motor shaft in alinement with the driven pulley 17. Belt 23 is threaded over pulleys 17 and 22 for operatively connecting them.

The bottom of the tank is recessed at 24 which recess is opened and closed by a gate valve 25 slidably fitted on the bottom wall of the tank. The gate valve is manipulated by a lever handle 26 pivoted to wall of tank 1 and at 27 to a link 28 which in turn is pivoted at 29 to the gate valve. The gate valve is interposed in a discharge conduit 30 in which a screw or other suitable conveyor 31 may be advantageously mounted for removing the mixture from the tank to a reservoir tank or to a roof coating machine.

A gas burner 32 may also be mounted below the tank and connected with a gas supply line 33 to provide a suitable means for heating the tank should it be desired to heat the tank while the materials are being mixed therein.

Figure 2:
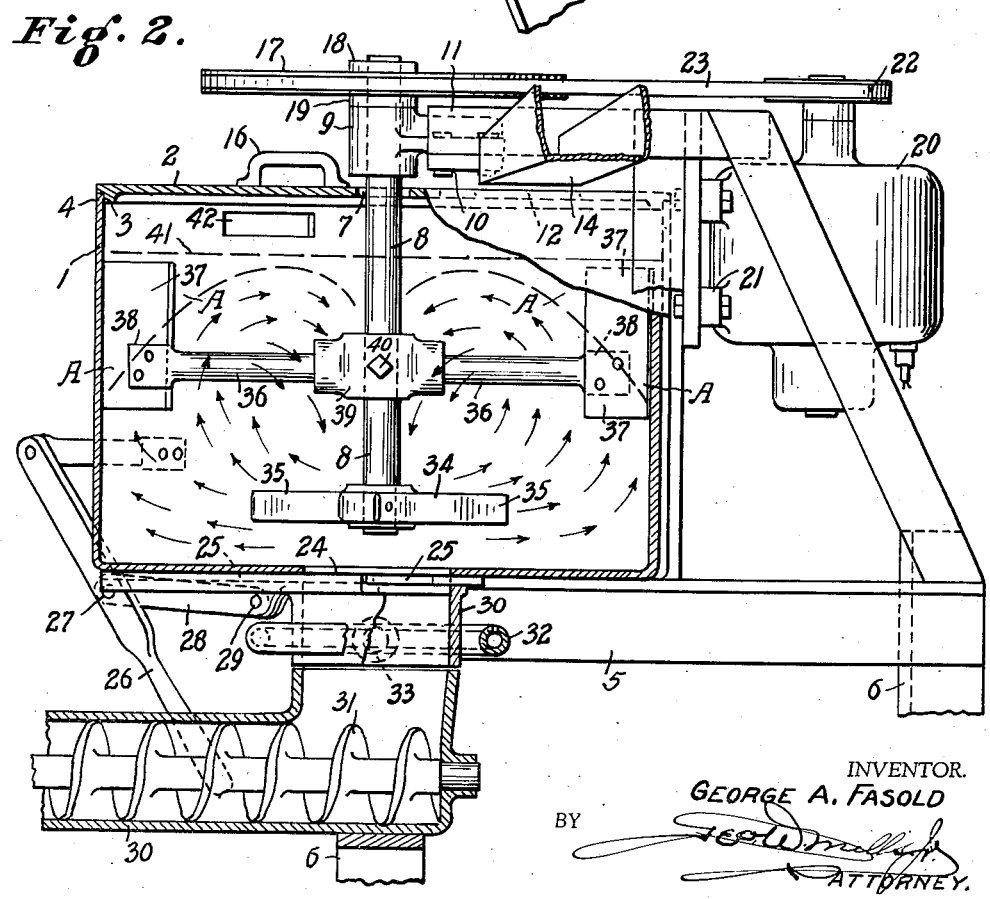
Fig. 2 is a side elevation of the apparatus with part of the tank wall removed.

The spindle 8 extends to a point near the bottom of the tank and has fixed on its bottom end an impeller 34 having any number of arcuate radial blades 35. The impeller blades rotate in the direction of the arrows or in a clockwise direction as viewed in Fig. 1. The blades impel the materials to the side wall of the tank where they are deflected upward, describing a circulating path or orbit as shown by the arrows (Fig. 2).

There is also mounted on the spindle one or more arms 36 to each of which is a paddle 37 attached at or near its end adjacent the tank wall. The paddle is preferably disposed at an angle to force the materials toward the axis or center of the tank. This may be conveniently done by having the ends or terminals 38 of the arms bent at an angle. These paddles agitate the materials and bring them into the circulating orbit set up by the impeller blades. The arms are fitted to a holder 39 which may be conveniently positioned on the spindle by a set screw 40. It has been found that the paddles are very efficient by projecting from a point in the circulating orbit to a point a substantial distance outside of it and near the side wall of the tank. The batch of mixing material ordinarily does not completely fill the tank, but is somewhat below the top. The paddles are of length to extend substantially to or just below the level of the mixing materials, which level is indicated by dotted line 41. A vent 42 may be advantageously provided in the wall of the tank.

While an apparatus has been described for carrying the invention into effect, it will be understood that there may be changes in details of construction without departing from the invention.

I claim:

1. A device for mixing finely divided, solid particles with liquid comprising a cylindrical tank, a vertically disposed rotating shaft in said tank, a centrifugal impeller mounted on said shaft and disposed adjacent the bottom of the tank and having blades thereon adapted to expel the liquid tangentially from the periphery of the blades to mix the liquid and finely divided material and paddle means also mounted on said shaft and arranged at an angle to the radius of the tank and disposed at the top of and contiguous to the inside wall of the tank for moving the finely divided material into the path or orbit of the liquid.

2. A device for mixing finely divided, solid particles with liquid comprising a cylindrical tank, a vertically disposed rotating shaft in said tank, a centrifugal impeller mounted on said shaft and disposed adjacent the bottom of the tank and having blades thereon adapted to expel the liquid tangentially from the periphery of the blades to mix the liquid and finely divided material and rotatably mounted paddle means arranged at an angle to the radius of the tank and disposed at the top of and contiguous to the inside wall of the tank for moving the finely divided material into the path or orbit of the liquid.

3. A device for mixing finely divided, solid particles with liquid comprising a cylindrical tank, a centrifugal impeller rotatably disposed adjacent the bottom of the tank and having blades thereon adapted to expel the liquid tangentially from the periphery of the blades to mix the liquid and finely divided material and rotatably mounted paddle means arranged at an angle to the radius of the tank and disposed at the top of and contiguous to the inside wall of the tank for moving the finely divided material into the path or orbit of the liquid.

GEORGE A. FASOLD.